United States Patent
Yakura et al.

(10) Patent No.: US 6,944,271 B2
(45) Date of Patent: Sep. 13, 2005

(54) INFORMATION DELIVERY MANAGEMENT APPARATUS, SYSTEM, AND METHOD

(75) Inventors: Kenichi Yakura, Yokohama (JP); Kyoko Inoue, Tokyo (JP); Hiroshi Uchida, Kawaguchi (JP)

(73) Assignee: NTT DoCoMo, Inc., Tokyo (JP)

(*) Notice: Subject to any disclaimer, the term of this patent is extended or adjusted under 35 U.S.C. 154(b) by 266 days.

(21) Appl. No.: 10/085,111

(22) Filed: Mar. 1, 2002

(65) Prior Publication Data

US 2002/0122540 A1 Sep. 5, 2002

(30) Foreign Application Priority Data

Mar. 2, 2001 (JP) ..................................... P2001-058704

(51) Int. Cl.[7] ............................................. A04M 11/00
(52) U.S. Cl. ............................. 379/88.12; 379/88.13; 379/88.22; 455/412.2; 455/414.1
(58) Field of Search ........................ 379/67.1, 88.08, 379/88.12, 88.16, 88.8, 88.22, 93.01, 201.01, 207.02; 455/412.1, 412.2, 413, 414.1, 414.3, 415; 340/7.21, 7.22, 7.23

(56) References Cited

U.S. PATENT DOCUMENTS 5,555,426 A 9/1996 Johnson et al. ............. 709/206
5,940,740 A * 8/1999 Aas et al. ................... 340/7.22
6,731,942 B1 * 5/2004 Nageli ........................ 455/458

FOREIGN PATENT DOCUMENTS

| EP | 0 838 962 | 4/1998 | ............ H04Q/7/12 |
| JP | 4-236541 | 8/1992 | |
| JP | 5-260117 | 10/1993 | |
| JP | 11-252164 | 9/1999 | |

* cited by examiner

Primary Examiner—Fan Tsang
Assistant Examiner—Ovidio Escalante
(74) Attorney, Agent, or Firm—Oblon, Spivak, McClelland, Maier & Neustadt, P.C.

(57) ABSTRACT

When information is delivered to a receiver mobile communication terminal, an update unit updates delivery status data stored in first storage, from "undelivered" to "delivered" in response to an update request from a relay when check permission data stored in second storage is "permitted." When in this state a sender terminal issues a check request for the delivery status data, a sending unit sends the delivery status data of "delivered" status to the sender terminal. When the check permission data is set as "prohibited," the delivery status data is not updated to the delivered status even if the receiver has received the information.

25 Claims, 10 Drawing Sheets

Fig.4 abc@docomo.ne.jp

40a

| REF. NO. | SENDER'S ADDRESS | TRANSMIT TIME | TITLE | SIZE (BYTE) | DELIVERY STATUS |
|---|---|---|---|---|---|
| 1 | xxx@docomo.ne.jp | 01/01 15:16 | HAPPY NEW YEA | 320 | UNDELIVERED |
| 2 | yyy@docomo.ne.jp | 01/02 10:48 | NEW YEAR'S GIFT | 360 | UNDELIVERED |
| 3 | xxx@docomo.ne.jp | 01/03 14:13 | TOMORROW'S SCHE | 380 | UNDELIVERED |
| 4 | zzz@docomo.ne.jp | 01/05 12:10 | DINNER | 180 | DELIVERED |

Fig.6

| abc@docomo.ne.jp | | | | | |
|---|---|---|---|---|---|
| MANAGE NO. | RECEIVER'S ADDRESS | TRANSMIT TIME | TITLE | SIZE (BYTE) | DELIVERY STATUS |
| 1 | xxx@docomo.ne.jp | 01/01 15:16 | HAPPY NEW YEA | 320 | DELIVERED |
| 2 | yyy@docomo.ne.jp | 01/02 10:48 | NEW YEAR'S GIFT | 360 | UNDELIVERED |
| 3 | xxx@docomo.ne.jp | 01/03 14:13 | TOMORROW'S SCHE | 380 | DELIVERED |
| 4 | zzz@docomo.ne.jp | 01/05 12:10 | DINNER | 180 | DELIVERED |

40a

INFORMATION DELIVERY MANAGEMENT APPARATUS, SYSTEM, AND METHOD

BACKGROUND OF THE INVENTION

1. Field of the Invention

The present invention relates to information delivery management apparatus, mobile communication equipment, information delivery check systems, and information delivery check methods for checking whether various information such as e-mail from sender mobile communication terminals has been delivered to receiver mobile communication terminals or not.

2. Related Background Art

As technological innovation makes quick and steady penetration of mobile communication equipment such as mobile phones or PHS (Personal Handy-phone System) into the general public, the mobile communication equipment is required to perform various functions. For example, as to the mobile phones, the simple call function cannot satisfy user needs alone and a lot of users want to use the mail function, which is an information transmitting means different from the call function.

Transmission and reception of mail between mobile communication terminals is carried out approximately as follows. First, mail transmitted from a certain mobile communication terminal is relayed, for example, by a packet gateway relay to be stored in a mail box provided in a mobile communication network and to be transmitted to a destination mobile communication terminal. If the destination mobile communication terminal is within the service area, the mail is delivered to the receiver mobile communication terminal. Use of this mail function allows information to be transmitted and received between mobile communication terminals without calls, which is extremely convenient.

SUMMARY OF THE INVENTION

There was, however, the following problem in use of the mail function between mobile communication terminals. Namely, after the sender has sent mail through the mobile communication terminal, the sender was unable to check whether or not the mail has been delivered to the correspondent, until receiving a reply from the correspondent mobile communication terminal. Incidentally, some mobile phones have a mode of searching for undelivered mail and allow the sender to use the search mode to check the undelivered mail by opening a predetermined window. However, the undelivered mail displayed in this search mode includes only messages that were not transmitted from the mobile communication terminal because the sender terminal itself was outside the service area. The search mode of this type did not allow the sender to check whether the transmitted mail from the mobile communication terminal has been delivered to the correspondent, either.

The inventors also assumed that the following problem would arise if the sender was allowed to check the delivery status of transmitted mail. Namely, since it is easy to turn the power on and off with the mobile communication terminals such as the mobile phones and the like, it is relatively easier to avoid calls or delay reception of mail by turning the power off, than in the case of fixed telephones. In other words, the mobile phone users can intentionally avoid or delay reception of information, which can be said to be one of the features of the mobile phones.

Under the conventional circumstances where the sender was unable to check the delivery status of transmitted mail, even if the receiver, e.g. in the press of business, had deferred a check of mail contents or a reply to such an extent that it was not rude to the mail sender, the sender was unable to check when the mail was delivered or whether the mail has been delivered or not. This feature was convenient to the mail users of mobile phones in a sense of privacy protection.

In view of this point, to make the sender free to check the complete delivery status of transmitted mail will spoil the above convenience and make the mail function inconvenient to the receiving side.

The present invention has been accomplished in order to solve the above problems and an object of the present invention is, therefore, to provide information delivery check systems permitting the sender to check the delivery status of transmitted information within the scope of not infringing on the receiver's privacy in transmission and reception of information between mobile communication terminals, and information delivery management apparatus, mobile communication equipment, and information delivery check methods applied thereto.

In order to accomplish the above object, the present invention provides an information delivery management apparatus for managing delivery status of information transmitted from a mobile communication terminal to another mobile communication terminal, comprising: first storage means for storing delivery status data indicating whether the information has been delivered to the receiver mobile communication terminal or not; second storage means for storing check permission data indicating whether a check of the delivery status data of information is permitted or prohibited, for every mobile communication terminal; updating means for, in response to an update request sent from the outside of the system when the information is delivered to the receiver mobile communication terminal, updating the delivery status data of undelivered status about the receiver mobile communication terminal, stored in the first storage means, to data of delivered status when the check permission data about the receiver mobile communication terminal, stored in the second storage means, indicates "permitted;" and sending means for extracting the delivery status data stored in the first storage means, in response to a request from the sender mobile communication terminal and sending the extracted delivery status data to the sender mobile communication terminal.

According to the information delivery management apparatus of the present invention, whenever information such as mail or the like is transmitted from a certain mobile communication terminal to another mobile communication terminal, the delivery status data about whether the information has been delivered to the receiver mobile communication terminal or not is stored into the first storage means. The information remains undelivered, for example, when the receiver mobile communication terminal is outside the service area or when the receiver mobile communication terminal is powered off. The second storage means is preliminarily provided with the check permission data about whether the receiver permits the sender to check the foregoing delivery status data or not. If the sender mobile communication terminal issues a check request for the delivery status data before the delivery of the information to the receiver mobile communication terminal, the sending means will send the delivery status data indicating "undelivered" to the sender mobile communication terminal.

After the information has been delivered to the receiver mobile communication terminal, the updating means updates the delivery status data from the data of "undelivered" status to the data of "delivered" status if the check permission data indicates "permitted," in response to an update request, for example, sent from a relay or the like outside the system of the information delivery management apparatus. When in this state the sender mobile communication terminal issues a check request for the delivery status data, the sending means sends the delivery status data of "delivered" status to the sender mobile communication terminal.

According to the present invention, as described above, the sender of information can check whether the information transmitted from the mobile communication terminal has been delivered to the correspondent or not. In addition, when the foregoing check permission data is set to one indicating "prohibited," the delivery status data is not updated to one indicating "delivered" even if the receiver has received the information. Therefore, the sender cannot know the fact that it has been delivered, whereby the receiver's privacy can be protected.

The information delivery management apparatus of the present invention may be configured so that when the check permission data about the receiver mobile communication terminal, stored in the second storage means, is "prohibited," the updating means, receiving the update request, updates the delivery status data of undelivered status stored in the first storage means, to data indicating that the check permission data is "prohibited."

In this case, the sender making the check request for the delivery status data after the delivery of the information can know that the receiver "prohibits" the check of the delivery status. Since then, the sender does not have to make access to the information delivery management apparatus in order to make a check request for the delivery status data. This can avoid waste communications between the sender mobile communication terminal and the information delivery management apparatus.

The information delivery management apparatus of the present invention may be configured so that when the check permission data about the receiver mobile communication terminal, stored in the second storage means, is "prohibited," the updating means, receiving the update request, does not update the delivery status data about the receiver mobile communication terminal stored in the first storage means.

In this case, even after the information has been delivered to the receiver mobile communication terminal, the data indicating "undelivered" will be sent to the sender requesting the delivery status data. This can avoid infringement on the privacy of the information receiver. This configuration can also obviate the need for the update work by the updating means.

The information delivery management apparatus of the present invention is preferably configured so that the second storage means stores the information and so that after the sending means sends the delivery status data to the sender mobile communication terminal, the sending means retransmits the information to the receiver mobile communication terminal on the basis of a retransmission command sent from the sender mobile communication terminal.

In this case, the information sender, ascertaining the undelivered status of the information, can give a command of retransmission through manipulation of the mobile communication terminal to retransmit the information to the receiver mobile communication terminal.

Further, an information delivery check system of the present invention is an information delivery check system for checking delivery status of information sent from a mobile communication terminal to another mobile communication terminal, comprising: mobile communication terminals of an information sender and an information receiver; the foregoing information delivery management apparatus; and a relay for relaying the information from the sender mobile communication terminal to send the information to the receiver mobile communication terminal and for sending the update request when detecting delivery of the information to the receiver mobile communication terminal.

Since the information delivery check system of the present invention incorporates the foregoing information delivery management apparatus, the sender is allowed to check the delivery status of the transmitted information within the scope of not infringing on the receiver's privacy.

Another information delivery management apparatus of the present invention is an information delivery management apparatus for managing delivery status of information transmitted from a mobile communication terminal to another mobile communication terminal, comprising: first storage means for storing delivery status data indicating whether the information has been delivered to the receiver mobile communication terminal or not; receiving means for receiving check permission data indicating whether a check of the delivery status data of the information from the receiver mobile communication terminal is permitted or prohibited, every time information is delivered; updating means for, in response to an update request sent from the outside of the system when the information is delivered to the receiver mobile communication terminal, updating the delivery status data of undelivered status about the receiver mobile communication terminal, stored in the first storage means, to data of delivered status when the check permission data received by the receiving means indicates "permitted;" and sending means for extracting the delivery status data stored in the first storage means in response to a request from the sender mobile communication terminal and sending the delivery status data to the sender mobile communication terminal.

According to the information delivery management apparatus of the present invention, whenever information such as mail or the like is transmitted from a certain mobile communication terminal to another mobile communication terminal, the delivery status data about whether the information has been delivered to the receiver mobile communication terminal or not is stored into the first storage means. If the sender mobile communication terminal issues a check request for the delivery status data before the delivery of the information to the receiver mobile communication terminal, the sending means will send the delivery status data indicating "undelivered" to the sender mobile communication terminal.

After the information has been delivered to the receiver mobile communication terminal, the receiving means receives the check permission data from the receiver mobile communication terminal. When thereafter receiving an update request from a relay or the like outside the system of the information delivery management apparatus, the updating means updates the delivery status data from the data of "undelivered" status to the data of "delivered" status if the check permission data indicates "permitted." When in this state the sender mobile communication terminal issues a check request for the delivery status data, the sending means sends the delivery status data of "delivered" status to the sender mobile communication terminal.

According to the present invention, as described above, the sender of information can check whether the information transmitted from the mobile communication terminal has been delivered to the correspondent or not. In addition, when the check permission data is determined as one indicating "prohibited" at the receiver mobile communication terminal, the delivery status data is not updated to one indicating "delivered" even if the receiver has received the information. Therefore, the sender cannot know the fact that it has been delivered, whereby the receiver's privacy can be protected.

The information delivery management apparatus of the present invention may be configured so that when the check permission data is "prohibited," the updating means, receiving the update request, updates the delivery status data of undelivered status stored in the first storage means, to data indicating that the check permission data is "prohibited."

In this case, the sender making the check request for the delivery status data after the delivery of the information can know that the receiver "prohibits" the check of the delivery status. Since then, the sender does not have to make access to the information delivery management apparatus in order to make a check request for the delivery status data. This can avoid waste communications between the sender mobile communication terminal and the information delivery management apparatus.

The information delivery management apparatus of the present invention may be configured so that when the check permission data is "prohibited," the updating means, receiving the update request, does not update the delivery status data about the receiver mobile communication terminal stored in the first storage means.

In this case, even after the information has been delivered to the receiver mobile communication terminal, the data indicating "undelivered" will be sent to the sender requesting the delivery status data. This can avoid infringement on the privacy of the information receiver. This configuration can also obviate the need for the update work by the updating means.

The information delivery management apparatus of the present invention is preferably configured so that the second storage means stores the information and so that after the sending means sends the delivery status data to the sender mobile communication terminal, the sending means retransmits the information to the receiver mobile communication terminal on the basis of a retransmission command sent from the sender mobile communication terminal.

In this case, the information sender, ascertaining the undelivered status of the information, can give a command of retransmission through manipulation of the mobile communication terminal to retransmit the information to the receiver mobile communication terminal.

A mobile communication terminal of the present invention is a mobile communication terminal capable of receiving information from another mobile communication terminal, which is capable of communicating with information delivery management apparatus having first storage means storing delivery status data indicating whether the information has been delivered or not, the mobile communication terminal comprising: check permission determining means for determining check permission data indicating whether a check of the delivery status data of the information is permitted or prohibited, every time information is delivered; and transmitting means for transmitting the check permission data determined, to the information delivery management apparatus.

According to the mobile communication terminal of the present invention, the receiver can determine whether the check of the delivery status data of the information is to be permitted or prohibited and thus the information sender cannot know the fact that the information has been delivered. Therefore, the receiver's privacy can be protected.

A further information delivery check system of the present invention is an information delivery check system for checking delivery status of information sent from a mobile communication terminal to another mobile communication terminal, comprising: a mobile communication terminal for transmitting information; the above-stated mobile communication terminal for receiving the information; the above-stated information delivery management apparatus; and a relay for relaying the information from the sender mobile communication terminal to send the information to the receiver mobile communication terminal and for sending the update request when detecting delivery of the information to the receiver mobile communication terminal.

Since the information delivery check system of the present invention incorporates the foregoing information delivery management apparatus and mobile communication terminal, the sender can check the delivery status of the transmitted information within the scope of not infringing on the receiver's privacy.

An information delivery check method of the present invention is an information delivery check method for checking delivery status of information transmitted from a mobile communication terminal to another mobile communication terminal, comprising: a step of storing delivery status data indicating whether the information has been delivered to the receiver mobile communication terminal or not, in first storage means of information delivery management apparatus comprising the first storage means, second storage means, updating means, and sending means; a step of storing check permission data indicating whether a check of the delivery status data of the information is permitted or prohibited, for every mobile communication terminal in the second storage means; a step of transmitting an update request for the delivery status data when a relay for relaying the information from the sender mobile communication terminal to send the information to the receiver mobile communication terminal, detects that the information has been delivered to the receiver mobile communication terminal; a step of, in response to the update request, letting the updating means update the delivery status data of undelivered status about the receiver mobile communication terminal, stored in the first storage means, to data of delivered status when the check permission data about the receiver mobile communication terminal stored in the second storage means is "permitted;" and a step of letting the sending means extract the delivery status data stored in the first storage means, in response to a request from the sender mobile communication terminal and send the extracted delivery status data to the sender mobile communication terminal.

According to the information delivery check method of the present invention, whenever information such as mail or the like is transmitted from a certain mobile communication terminal to another mobile communication terminal, the delivery status data about whether the information has been delivered to the receiver mobile communication terminal or not is stored into the first storage means. The second storage means stores the check permission data about whether the receiver permits the sender to check the foregoing delivery status data or not. If the sender mobile communication terminal issues a check request for the delivery status data before the delivery of the information to the receiver mobile communication terminal, the sending means will send the delivery status data indicating "undelivered" to the sender mobile communication terminal.

After the information has been delivered to the receiver mobile communication terminal, the updating means of the information delivery management apparatus updates the delivery status data from the data of "undelivered" status to the data of "delivered" status if the check permission data indicates "permitted," in response to an update request transmitted from the relay detecting the delivery of the information. When in this state the sender mobile communication terminal issues a check request for the delivery status data, the sending means sends the delivery status data of "delivered" status to the sender mobile communication terminal.

According to the present invention, as described above, the sender of information can check whether the information transmitted from the mobile communication terminal has been delivered to the correspondent or not. In addition, when the foregoing check permission data is set to one indicating "prohibited," the delivery status data is not updated to one indicating "delivered" even if the receiver has received the information. Therefore, the sender cannot know the fact that it has been delivered, whereby the receiver's privacy can be protected.

Another information delivery check method of the present invention is an information delivery check method for checking delivery status of information transmitted from a mobile communication terminal to another mobile communication terminal, comprising: a step of storing delivery status data indicating whether the information has been delivered to the receiver mobile communication terminal or not, in first storage means of information delivery management apparatus comprising the first storage means, second storage means, updating means, and sending means; a step of, when the receiver mobile communication terminal receives the information from a relay, requesting to make a decision on check permission data indicating whether a check of the delivery status data of the information is permitted or prohibited; a step of letting the receiver mobile communication terminal transmit the check permission data determined, to the information delivery management apparatus; a step of transmitting an update request for the delivery status data to the information delivery management apparatus when the relay for relaying the information from the sender mobile communication terminal to send the information to the receiver mobile communication terminal, detects that the information has been delivered to the receiver mobile communication terminal; a step of, in response to the update request, letting the updating means update the delivery status data of undelivered status about the receiver mobile communication terminal, stored in the first storage means, to data of delivered status when the check permission data determined at the receiver mobile communication terminal is "permitted;" and a step of letting the sending means extract the delivery status data stored in the first storage means, in response to a request from the sender mobile communication terminal and send the extracted delivery status data to the sender mobile communication terminal.

According to the information delivery check method of the present invention, whenever information such as mail or the like is transmitted from a certain mobile communication terminal to another mobile communication terminal, the delivery status data about whether the information has been delivered to the receiver mobile communication terminal or not is stored into the first storage means. If the sender mobile communication terminal issues a check request for the delivery status data before the delivery of the information to the receiver mobile communication terminal, the sending means will send the delivery status data indicating "undelivered" to the sender mobile communication terminal.

After the information has been delivered to the receiver mobile communication terminal, the check permission data is determined at the receiver mobile communication terminal and the check permission data determined is sent to the information delivery management apparatus. When receiving an update request from the relay detecting the delivery of the information, the updating means of the information delivery management apparatus updates the delivery status data from the data of "undelivered" status to the data of "delivered" status if the check permission data indicates "permitted." When in this state the sender mobile communication terminal issues a check request for the delivery status data, the sending means sends the delivery status data of "delivered" status to the sender mobile communication terminal.

According to the present invention, as described above, the sender of information can check whether the information transmitted from the mobile communication terminal has been delivered to the correspondent or not. In addition, when the check permission data is determined as one indicating prohibited at the receiver mobile communication terminal, the delivery status data is not updated to one indicating "delivered" even if the receiver has received the information. Therefore, the sender cannot know the fact that it has been delivered, whereby the receiver's privacy can be protected.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more readily described with reference to the accompanying drawings, in which:

FIG. 4 is a diagram showing a transmitted mail management table stored in a delivery status management database;

FIG. 6 is a diagram showing the transmitted mail management table in an updated state of delivery status data;

DESCRIPTION OF THE PREFERRED EMBODIMENTS

[First Embodiment]

Figure 1:
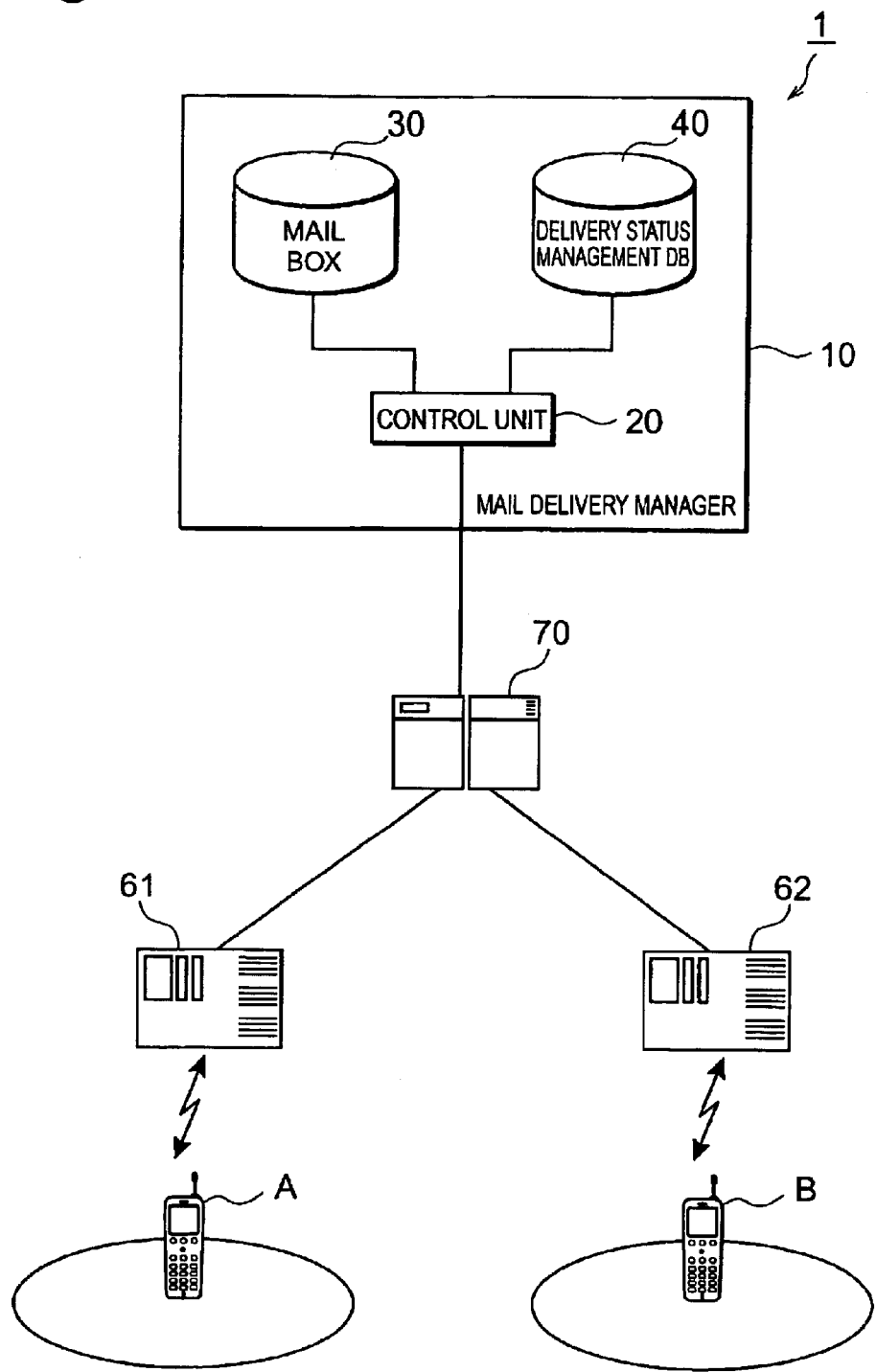
FIG. 1 is a schematic diagram showing a mail delivery check system of the first embodiment.

FIG. 1 is a block diagram showing a mail delivery check system (information delivery check system) 1 to which a mail delivery management apparatus (information delivery management apparatus) 10 of the present embodiment is applied. The mail delivery check system 1 is comprised of the mail delivery management apparatus 10, subscriber packet processors 61, 62, a packet gateway relay 70, a mobile communication terminal A located within the control area of the subscriber packet processor 61, and a mobile communication terminal B located within the control area of the subscriber packet processor 62. The packet gateway relay 70 is connected through telecommunications circuits to the mail delivery management apparatus 10 and the subscriber packet processors 61, 62.

The mail delivery management apparatus 10 is composed of a control unit 20, a mail box (second storage means) 30, and a delivery status management database (first storage means) 40. Further, the mobile communication terminals A, B are equipped with the so-called mail communication function and are thus capable of exchanging various information including character information, image information, etc. with each other.

The subscriber packet processors 61, 62 transmit and receive information such as mail or the like to and from the mobile communication terminals A, B in the respective areas. Each subscriber packet processor 61, 62 transmits information such as mail or the like received from the mobile communication terminal A, B in the area to the packet gateway relay 70 and also transmits information received from the packet gateway relay 70 to the mobile communication terminal A, B in the area.

The packet gateway relay 70 instructs the control unit 20 to store the mail received from the mobile communication terminal A, B, in the mail box 30 for the destination mobile communication terminal and transmits the mail to the destination mobile communication terminal in accordance with a command from the control unit 20. The packet gateway relay 70 is provided with a function of detecting whether the mail has been delivered in good order to the destination or not. Specifically, the packet gateway relay 70 compares the data size of the transmitted mail with the data size of the mail actually received at the destination mobile communication terminal. When they agree with each other, it is determined that the mail has accurately been delivered to the destination. Further, when the packet gateway relay 70 detects the delivery of the mail, it issues a request of updating the delivery status data, described later, to the control unit 20.

Figure 2:
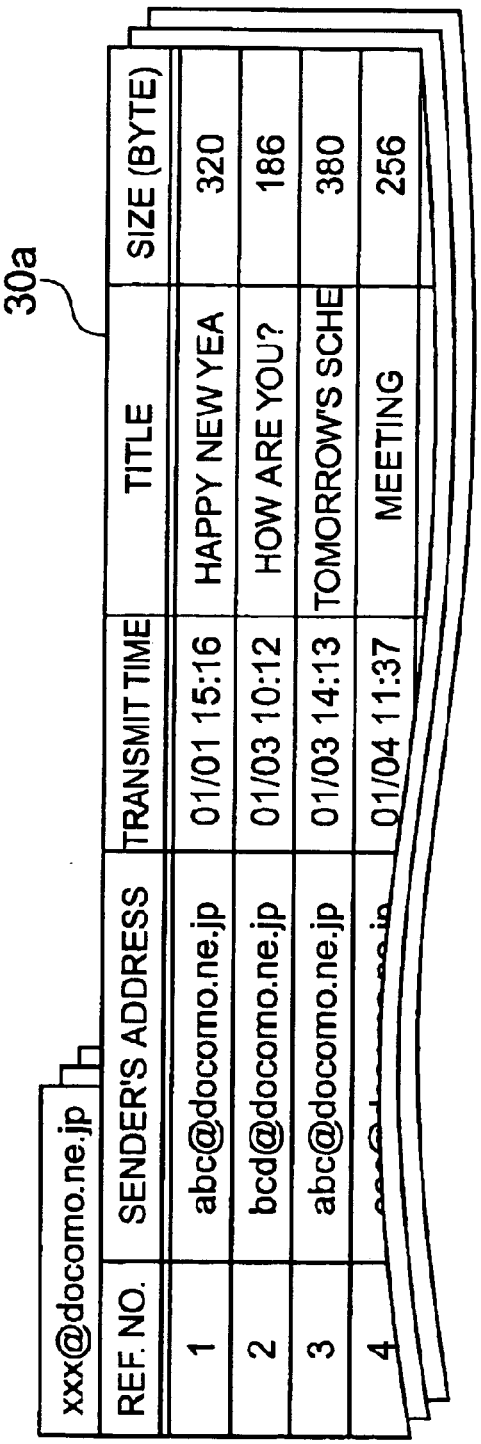
FIG. 2 is a diagram showing a mail management table stored in a mail box.

Data tables stored in the mail box 30 will be described below with reference to FIGS. 2 and 3. The mail box 30 stores mail management tables 30a shown in FIG. 2 and a check permission data management table 30b shown in FIG. 3.

A mail management table 30a indicates the details of mail transmitted to each mobile communication terminal and includes sender's mail addresses, mail transmission times, titles, and mail data sizes. FIG. 2 shows a list of mail transmitted to the mobile communication terminal with the address of <xxx@docomo.ne.jp> and, in addition thereto, the tables 30a store information about all the mobile communication terminals using the mail delivery check system 1.

The check permission data management table 30b includes the check permission data indicating whether each user "permits" or "prohibits" the sender's checking the delivery status of the mail to the user. Each user is allowed freely to set the check permission data at the time of contract of the mobile communication terminal or thereafter. This check permission data is stored for every mobile communication terminal and is associated with the mail management tables 30a of FIG. 2 by the mail addresses as keys. It is also possible to employ a configuration wherein numbers of mobile communication terminals are stored in the mail management tables 30a and the check permission data management table 30b and data management is conducted based thereon.

Data tables stored in the delivery status management database 40 will be described below with reference to FIG. 4. The delivery status management database 40 stores transmitted mail management tables 40a indicating the details of mail transmitted from the respective mobile communication terminals, and a table 40a includes destination addresses, mail transmission times, titles, data sizes of mail, and delivery status data of mail. The delivery status data is data indicating whether the mail transmitted from each sender has been delivered to a correspondent or not. Each data stored in the delivery status management database 40 is prepared so as to be viewable on a display at each mobile communication terminal by making access to a predetermined Internet address.

In response to the foregoing update request from the packet gateway relay 70, the control unit 20 checks whether the check permission data in the check permission data management table 30b is "permitted." If "permitted" then the control unit updates the delivery status data for the mobile communication terminal having received the mail in the delivery status management database 40, from "undelivered" to "delivered." In response to a request from a mobile communication terminal, the control unit 20 extracts the delivery status data about the mail having been transmitted from the mobile communication terminal, out of the delivery status management database 40 and sends it to the mobile communication terminal.

Figure 5:
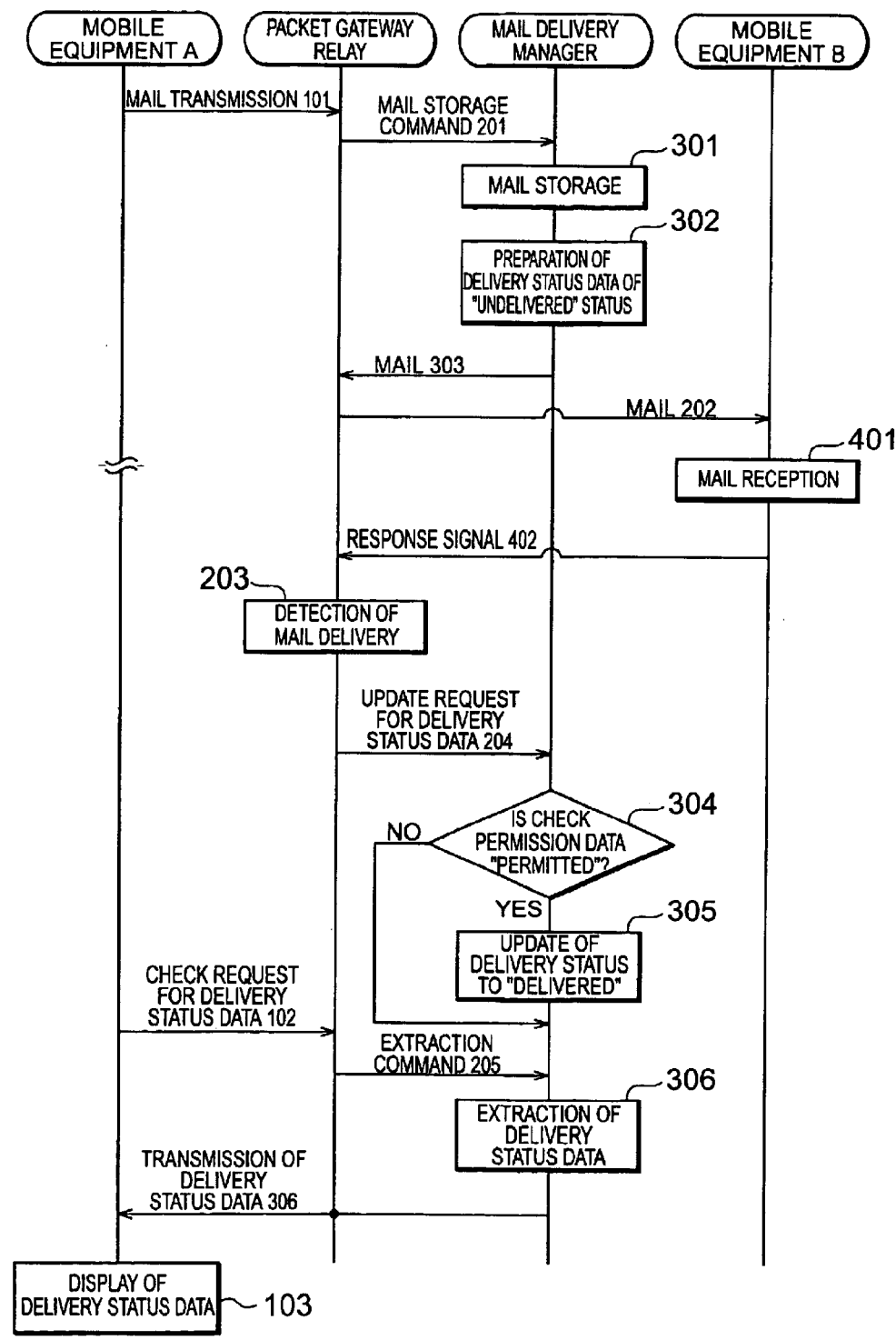
FIG. 5 is a diagram showing the operation sequence of the mail delivery check system of the first embodiment.

An information delivery check method in the present embodiment will be described below with reference to the operation sequence shown in FIG. 5. Here is described a case where the mobile communication terminal A with the mail address of <abc@docomo.ne.jp> sends mail to the mobile communication terminal B with the mail address of <xxx@docomo.ne.jp>. Let us assume that the mail box 30 preliminarily stores the check permission data of the mobile communication terminal B.

When the mobile communication terminal A sends mail to the mobile communication terminal B at the first step (S101), the mail is delivered via the subscriber packet processor 61 to the packet gateway relay 70. Let us suppose herein that the mail sent from the mobile communication terminal A was one having the data size of 380 bytes, the title of "Tomorrow's schedule," and the transmission time of 14:13 January 3rd.

Then the packet gateway relay 70 instructs the control unit 20 of the mail delivery management apparatus 10 to store the mail (S201). Receiving this instruction, the control unit 20 stores the information about the mail in the mail box 30, as indicated at reference number 3 in the mail management table 30a of FIG. 2 (S301). Further, the control unit 20 prepares the delivery status data indicating "undelivered" in the delivery status management database 40, as indicated at management number 3 in the transmitted mail management table 40a (S302). Thereafter, the control unit 20 of the mail delivery management apparatus 10 sends the mail stored in the mail box 30, to the packet gateway relay 70 (S303).

The mail from the mail delivery management apparatus 10 is transmitted via the packet gateway relay 70 and the subscriber packet processor 62 to the mobile communication terminal B (S202). If the mobile communication terminal B exists within the service area, the mail is received by the mobile communication terminal B (S401) The mobile communication terminal B, receiving the mail, sends a response signal to the packet gateway relay 70 (S402). This response signal includes information about the data size of the mail actually received at the mobile communication terminal B.

Then the packet gateway relay 70, receiving the response signal from the mobile communication terminal B, checks whether the data size (380 bytes) sent to the mobile communication terminal B agrees with the data size of the mail actually received at the mobile communication terminal B, thereby determining whether the mail has accurately been delivered to the destination (S203). When the two data sizes disagree, it is determined that all the information of the mail is not delivered to the mobile communication terminal B. Detecting accurate delivery of the mail to the mobile communication terminal B, the packet gateway relay 70 sends an update request for the delivery status data to the mail delivery management apparatus 10 (S204).

The control unit 20 of the mail delivery management apparatus 10, receiving the update request for the delivery status data, determines whether the check permission data (cf. FIG. 3) in the check permission data management table 30b of the mail box 30 is "permitted" or "prohibited" (S304). Since the check permission data is "permitted" for the mobile communication terminal B with the mail address of <xxx@docomo.ne.jp>, the control unit 20 as the updating means updates the delivery status data for the mobile communication terminal B in the transmitted mail management table 40a stored in the delivery status management database 40, from "undelivered" to "delivered," as indicated at management number 3 in FIG. 6 (S305).

Figure 3:
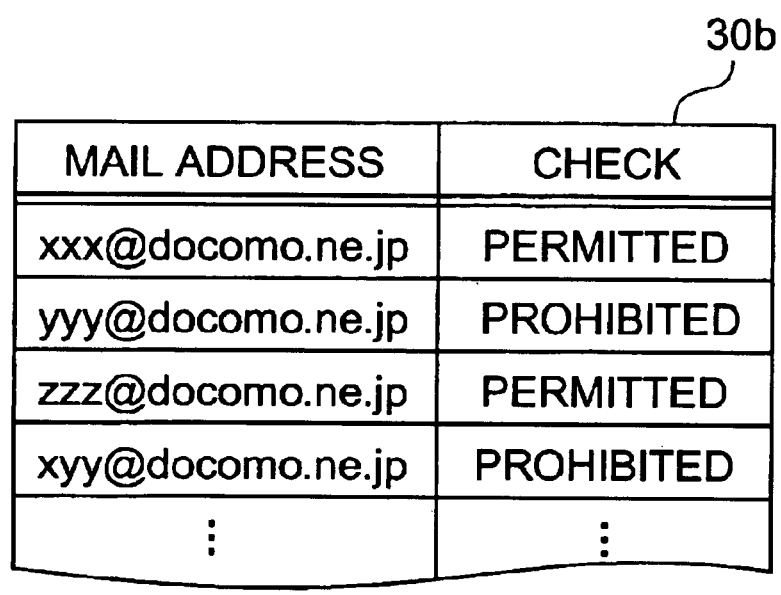
FIG. 3 is a diagram showing a check permission data management table stored in the mail box.

Although here was described the case where the check permission data of the receiver mobile communication terminal B was "permitted," the control unit 20 will not perform the operation at S305 if the check permission data is "prohibited" as in the case of the mobile communication terminal with the mail address of <yyy@docomo.ne.jp> (cf. FIG. 3). Namely, the delivery status data of the mail transmitted from the mobile communication terminal A to the receiver mobile communication terminal remains "undelivered."

The following will describe a process in which the mobile communication terminal A makes access to a site for viewing the delivery status data, in the delivered state of the mail to the mobile communication terminal B as described above. When the user of the mobile communication terminal A performs a predetermined input operation, a check request signal for the delivery status data is transmitted from the mobile communication terminal A via the subscriber packet processor 61 to the packet gateway relay 70 (S102). Receiving this request signal, the packet gateway relay 70 sends an extraction command to the control unit 20 of the mail delivery management apparatus 10 (S205).

Figure 7:
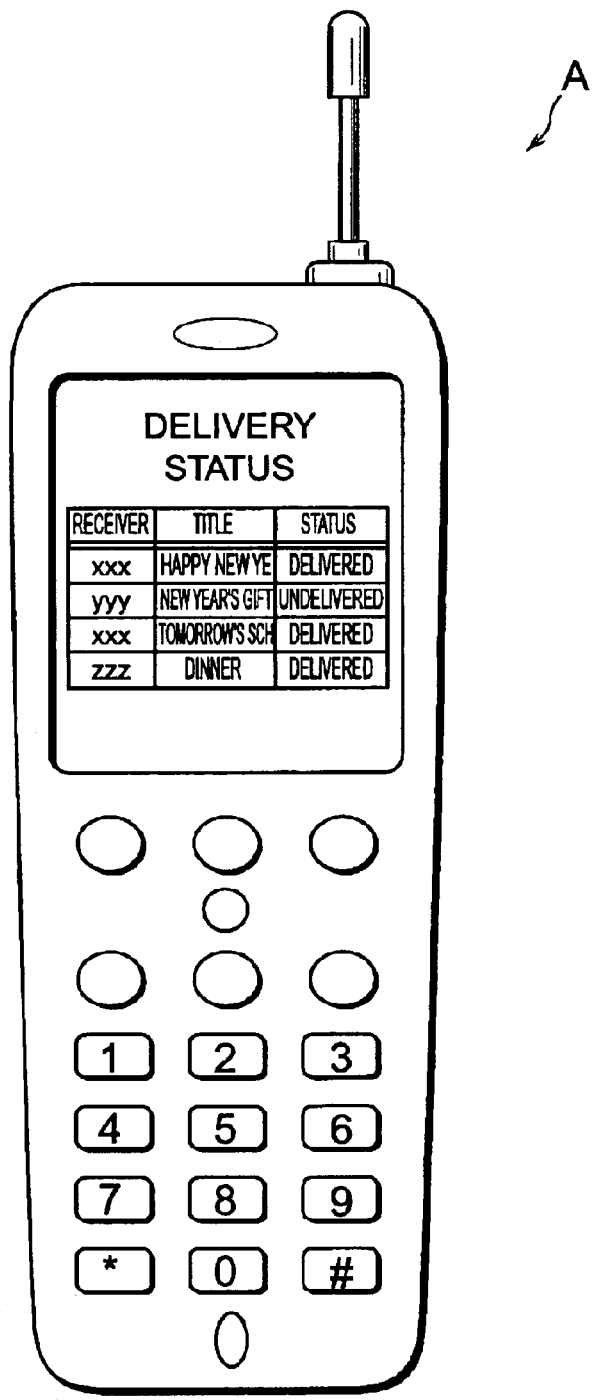
FIG. 7 is a diagram showing a display state of delivery status data at a sender mobile communication terminal.

Then the control unit 20, receiving the extraction command, extracts the delivery status data about the mobile communication terminal A from the delivery status management database 40 (S306). Thereafter, the control unit 20 as the sending means sends the delivery status data thus extracted, via the packet gateway relay 70 and the subscriber packet processor 61 to the mobile communication terminal A (S306). When the delivery status data reaches the mobile communication terminal A, the site indicating the mail delivery status is displayed, as shown in FIG. 7, on the display of the mobile communication terminal A (S103). If the check request for the delivery status data at S102 is issued from the mobile communication terminal A before the delivery of the mail with the tile of "Tomorrow's schedule" to the mobile communication terminal B, an indication of "undelivered" will be displayed as to the mail of "Tomorrow's schedule," because the delivery status data is not updated yet.

According to the present embodiment, as described above, the user of the mobile communication terminal A having transmitted the mail can make access to the site indicated on the display to check whether the mail transmitted from the mobile communication terminal A has been delivered to the correspondent mobile communication terminal B or not. In addition, the user of the mobile communication terminal B is also allowed preliminarily to set the check permission data as "prohibited," and in that case, the delivery status data is not updated to "delivered" even if the receiver has received the mail. Therefore, the user of the mobile communication terminal A as the sender cannot know the fact that the mail has been delivered, whereby the privacy can be protected for the user of the mobile communication terminal B as the receiver.

Since in the present embodiment the system is configured so that the control unit 20 does not update the delivery status data in the case of the check permission data of "prohibited" at S304, the data of "undelivered" is sent to the mobile communication terminal A requesting the delivery status data even after the mail has been delivered to the receiver mobile communication terminal B. This prevents the infringement on the privacy of the user of the mobile communication terminal B as the receiver. It can also eliminate the update work of the delivery status data at the control unit 20.

The system may also be configured so that in the case of the check permission data of "prohibited" at S304, the control unit 20 updates the delivery status data of "undelivered" to "data indicating that the check permission data is prohibited." In this case, the user of the mobile communication terminal A, making a check request for the delivery status data after the delivery of the mail to the mobile communication terminal B, can know that the user of the mobile communication terminal B "prohibits" the check of the delivery status. After that, therefore, the user of the mobile communication terminal A does not have to make access to the mail delivery management apparatus 10 in order to make a check request for the delivery status data. This can avoid waste communications between the sender mobile communication terminal A and the mail delivery management apparatus 10.

In the present embodiment, the system may also be configured so that, at the display step of S103 to display the mail delivery status on the display of the mobile communication terminal A, another window may also be displayed for letting the user determine whether the undelivered mail is to be retransmitted to the receiver mobile communication terminal B or not. In this case, if the user of the mobile communication terminal A selects a command of retransmission, the command of retransmission will be sent via the packet gateway relay 70 to the control unit 20 of the mail delivery management apparatus 10. The control unit 20, receiving the retransmission command, extracts the mail sent from the user A but not delivered yet to the receiver, from the mail box 30 and retransmits the mail via the packet gateway relay 70 and the subscriber packet processor 62 to the mobile communication terminal B. The operation after the retransmission is substantially the same as the aforementioned operation at and after S401.

When the system is constructed as described above, the mail sender (the user of the mobile communication terminal A), ascertaining the undelivered status of the mail, can manipulate the mobile communication terminal A to give a command of retransmission and thereby retransmit the information to the receiver mobile communication terminal B, whereby the mail can be delivered more securely to the correspondent.

[Second Embodiment]

Figure 8:
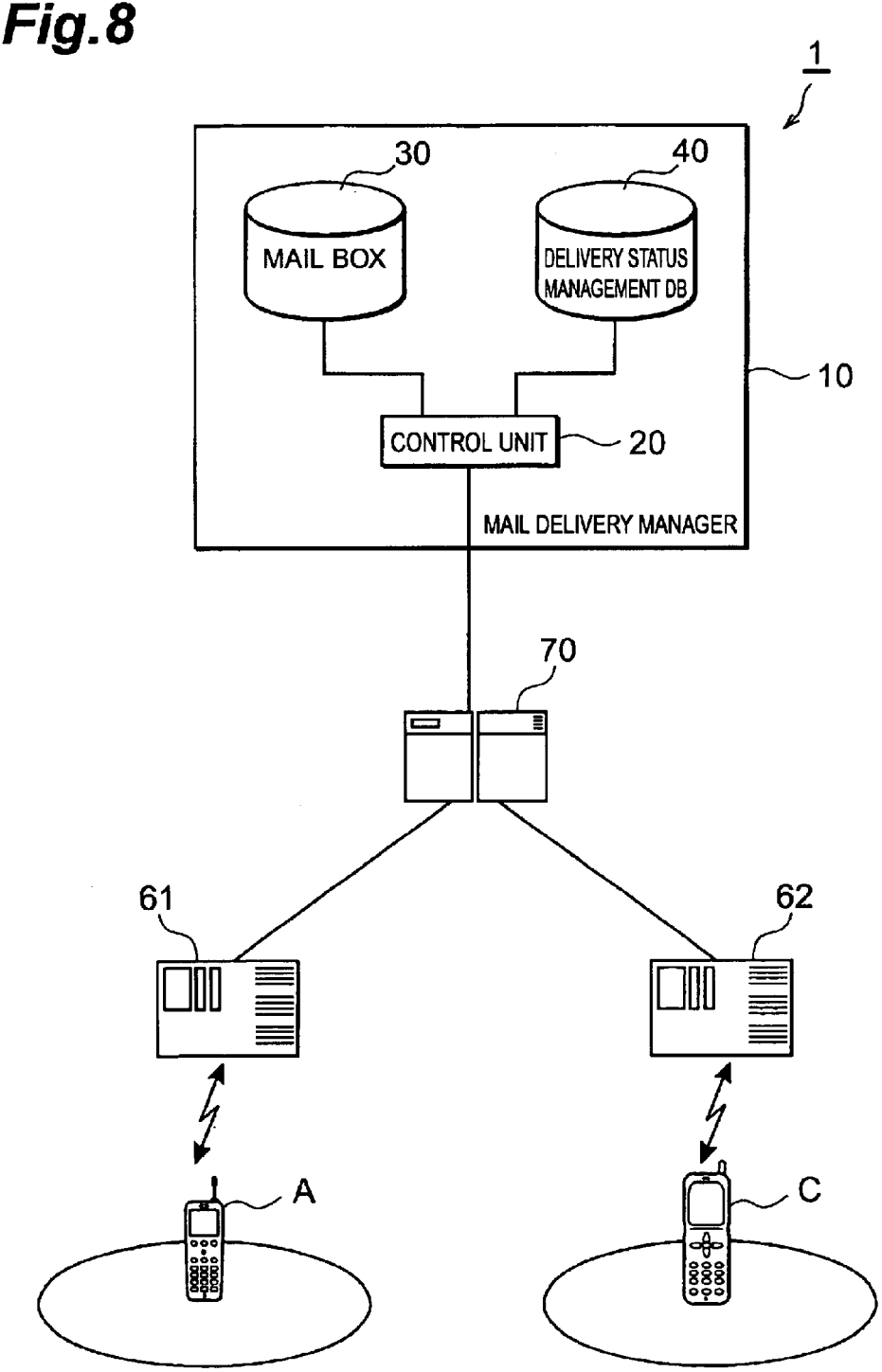
FIG. 8 is a schematic diagram showing another mail delivery check system of the second embodiment.

The second embodiment of the present invention will be described below with reference to FIGS. 8 to 10. The mail delivery check system of the present embodiment is different from the first embodiment mainly in the configuration of the mobile communication terminal of mail receiver and the tables stored in the mail box 30.

Figure 9:
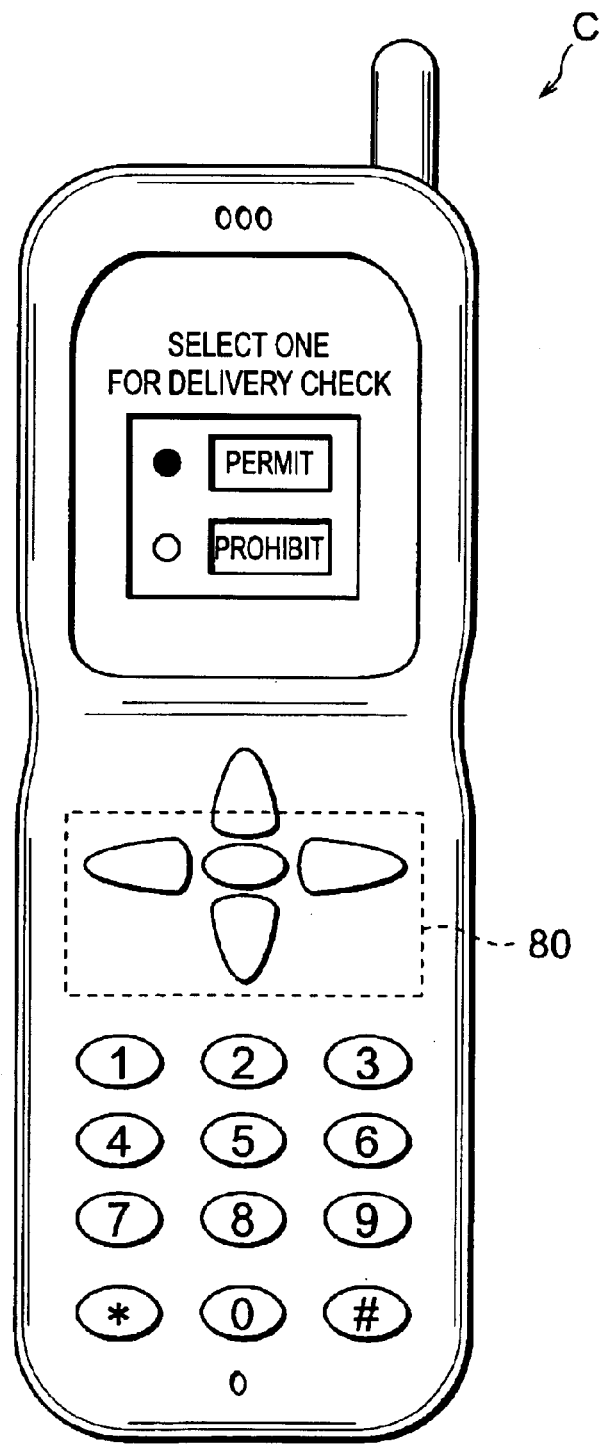
FIG. 9 is a diagram showing a mobile communication terminal used in the mail delivery check system of the second embodiment.
Figure 10:
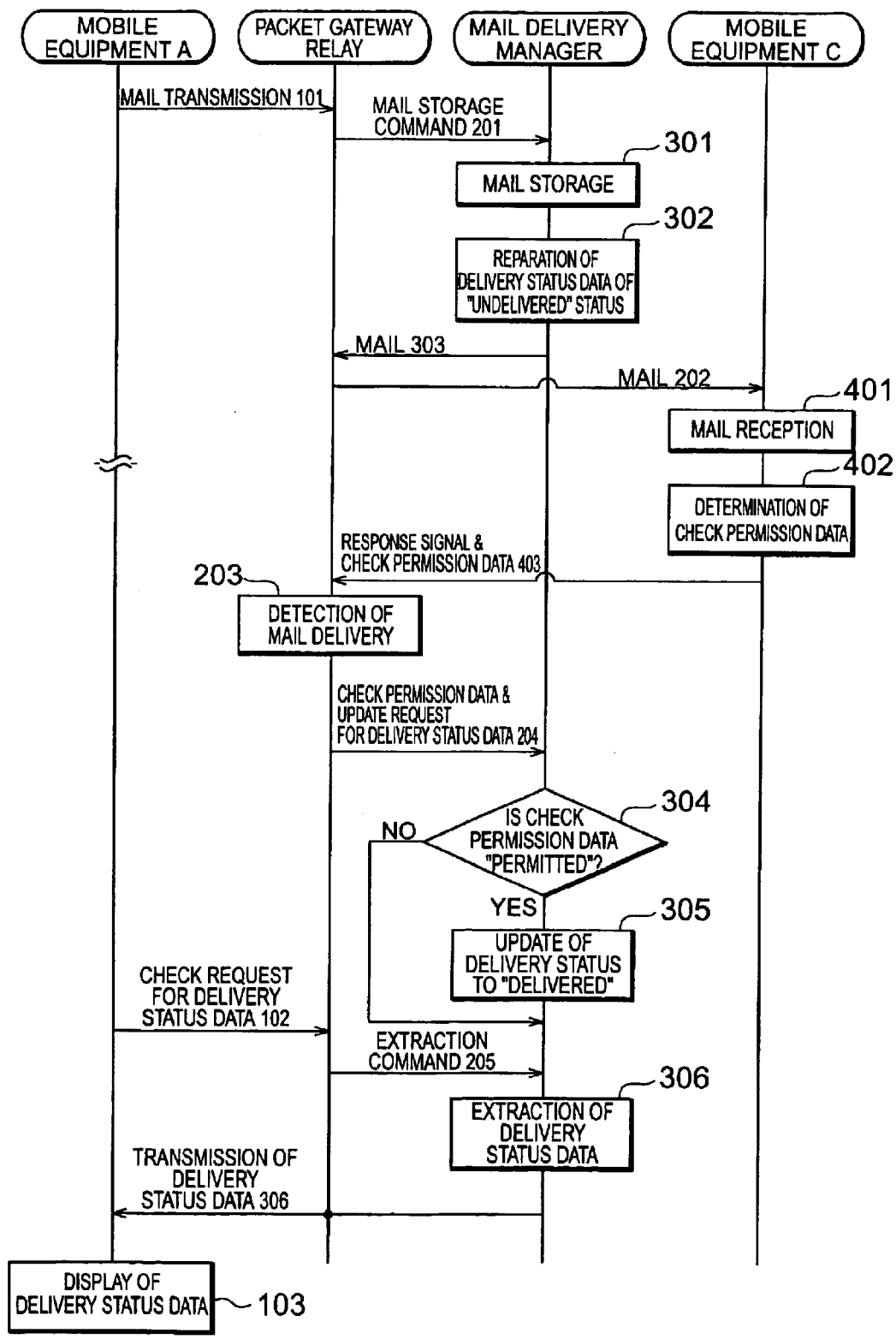
FIG. 10 is a diagram showing the operation sequence of the mail delivery check system of the second embodiment.

The mobile communication terminal C of the mail receiver incorporates a control unit (check permission determining means) 80 for determining the check permission data indicating whether the receiver permits or prohibits the mail sender's checking the delivery status data concerning mail, at every reception of mail, as shown in FIG. 9. The control unit 80 requests the user to determine whether the check permission data is to be set as "permitted" or "prohibited," upon reception of mail.

The mail box 30 of the present embodiment stores the mail management tables 30a but does not store the check permission data management table 30b shown in FIG. 3. Namely, the mail delivery management apparatus 10 does not retain the check permission data.

An information delivery check method in the present embodiment will be described below with reference to the operation sequence shown in FIG. 10. Let us suppose herein for convenience' sake of description that the mail address of the mobile communication terminal C is <xxx@docomo.ne.jp>, which is the same as that of the mobile communication terminal B.

When the mobile communication terminal A sends mail to the mobile communication terminal C at the first step (S01), the mail is delivered via the subscriber packet processor 61 to the packet gateway relay 70. Let us suppose herein that the mail sent from the mobile communication terminal A was one having the data size of 380 bytes, the title of "Tomorrow's schedule," and the transmission time of 14:13 January 3rd, as in the first embodiment.

Then the packet gateway relay 70 instructs the control unit 20 of the mail delivery management apparatus 10 to store the mail (S201). Receiving this instruction, the control unit 20 stores the information about the mail in the mail box 30 (S301) Further, the control unit 20 prepares the delivery status data indicating "undelivered" in the delivery status management database 40 (S302). Thereafter, the control unit 20 of the mail delivery management apparatus 10 sends the mail stored in the mail box 30, to the packet gateway relay 70 (S303).

The mail from the mail delivery management apparatus 10 is transmitted via the packet gateway relay 70 and the subscriber packet processor 62 to the mobile communication terminal C (S202). If the mobile communication terminal C stays within the service area, the mail is received by the mobile communication terminal C (S401).

After receiving the mail, the mobile communication terminal C performs the process of determining the check permission data (S402). Specifically, as shown in FIG. 9, the control unit 80 of the mobile communication terminal C requests the user to determine whether the check permission data is to be "permitted" or "prohibited," through the display. The user selects either "permitted" or "prohibited" through manipulation of cross keys and a determination key. Let us suppose herein that the user selected "permitted."

The mobile communication terminal C after the determination of the check permission data sends a response signal and the check permission data to the packet gateway relay 70 (S403). The check permission data is transmitted to the packet gateway relay 70 by known technology of the mobile communication terminal C under control of the control unit 80 also functioning as the transmitting means. The response signal includes the information on the data size of the mail actually received at the mobile communication terminal C.

Then the packet gateway relay 70, receiving the response signal from the mobile communication terminal C, checks whether the data size (380 bytes) sent to the mobile communication terminal C agrees with the data size of the mail actually received at the mobile communication terminal C, thereby determining whether the mail has accurately been delivered to the destination (S203). Detecting accurate delivery of the mail to the mobile communication terminal C, the packet gateway relay 70 sends an update request for the delivery status data and the check permission data to the control unit 20 of the mail delivery management apparatus 10 (S204).

Receiving the update request for the delivery status data and the check permission data, the control unit 20 of the mail delivery management apparatus 10 as the receiving means determines whether the check permission data received is "permitted" or "prohibited" (S304). Since the check permission data concerning the mail at this time is "permitted," the control unit 20 as the updating means updates the delivery status data for the mobile communication terminal C in the transmitted mail management table 40a stored in the delivery status management database 40, from "undelivered" to "delivered" (S305).

Although here was described the case where the check permission data of the receiver mobile communication terminal C was "permitted," the control unit 20 will not perform the operation at S305 if the check permission data was determined as "prohibited" at the mobile communication terminal C. Namely, the delivery status data of the mail transmitted from the mobile communication terminal A to the mobile communication terminal C remains "undelivered."

The following will describe a process in which the mobile communication terminal A makes access to the site for providing the delivery status data, in the delivered state of the mail to the mobile communication terminal C as described above. When the user of the mobile communication terminal A performs the predetermined input operation, a check request signal for the delivery status data is transmitted from the mobile communication terminal A via the subscriber packet processor 61 to the packet gateway relay 70 (S102). Receiving this request signal, the packet gateway relay 70 sends an extraction command to the control unit 20 of the mail delivery management apparatus 10 (S205).

Then the control unit 20, receiving the extraction command, extracts the delivery status data about the mobile communication terminal A from the delivery status management database 40 (S306). Thereafter, the control unit 20 as the sending means sends the delivery status data thus extracted, via the packet gateway relay 70 and the subscriber packet processor 61 to the mobile communication terminal A (S306). When the delivery status data reaches the mobile communication terminal A, the site indicating the mail delivery status is displayed on the display of the mobile communication terminal A, as in FIG. 7 (S103). If the check request for the delivery status data at S102 is issued from the mobile communication terminal A before the delivery of the mail with the tile of "Tomorrow's schedule" to the mobile communication terminal C, an indication of "undelivered" will be displayed as to the mail of "Tomorrow's schedule," because the delivery status data is not updated.

According to the present embodiment, as described above, the user of the mobile communication terminal A having transmitted the mail can make access to the site indicated on the display to check whether the mail transmitted from the mobile communication terminal A has been delivered to the correspondent mobile communication terminal C or not. In addition, when the check permission data is determined as "prohibited" at the receiver mobile communication terminal C, the delivery status data is not updated to "delivered" even with reception of the mail. Therefore, the user of the mobile communication terminal A as the sender cannot know the fact that the mail has been delivered to the receiver, whereby the privacy can be protected for the user of the mobile communication terminal C as the receiver.

Since in the present embodiment the system is configured so that the control unit 20 does not update the delivery status data in the case of the check permission data of "prohibited" at S304, the data of "undelivered" is sent to the mobile communication terminal A requesting the delivery status data even after the mail has been delivered to the receiver mobile communication terminal C. This prevents the infringement on the privacy of the user of the mobile communication terminal C as the receiver. It can also eliminate the update work of the delivery status data at the control unit 20.

The system may also be configured so that in the case of the check permission data of "prohibited" at S304, the control unit 20 updates the delivery status data of "undelivered" to "data indicating that the check permission data is prohibited." In this case, the user of the mobile communication terminal A, making a check request of the delivery status data after the delivery of the mail to the mobile communication terminal C, can know that the user of the mobile communication terminal C "prohibits" the check of the delivery status. After that, therefore, the user of the mobile communication terminal A does not have to make access to the mail delivery management apparatus 10 in order to make a check request for the delivery status data. This can avoid waste communications between the sender mobile communication terminal A and the mail delivery management apparatus 10.

In the present embodiment, the system may also be configured so that, at the display step of S103 to display the mail delivery status on the display of the mobile communication terminal A, another window may also be displayed for letting the user determine whether the undelivered mail is to be retransmitted to the receiver mobile communication terminal C. In this case, if the user of the mobile communication terminal A selects a command of retransmission, the command of retransmission will be sent via the packet gateway relay 70 to the control unit 20 of the mail delivery management apparatus 10. The control unit 20, receiving the retransmission command, extracts the mail sent from the user A but not delivered yet to the receiver, from the mail box 30 and retransmits the mail via the packet gateway relay 70 and the subscriber packet processor 62 to the mobile communication terminal C. The operation after the retransmission is substantially the same as the aforementioned operation at and after S401.

When the system is constructed as described above, the mail sender (the user of the mobile communication terminal A), ascertaining the undelivered status of the mail, can manipulate the mobile communication terminal A to give a command of retransmission and thereby retransmit the information to the receiver mobile communication terminal C, whereby the mail can be delivered more securely to the correspondent.

The invention accomplished by the inventors was specifically described above on the basis of the embodiments thereof, but it should be noted that the present invention is by no means limited to each of the above embodiments. For example, the check permission data management table 30b shown in FIG. 3 may be stored in the mail box 30 of the second embodiment. In this case, the check permission data in the check permission data management table 30b is used as preferences, and the user may change the setting to desired check permission data at that time upon every reception of mail.

The information transmitted between mobile communication terminals in the present invention is not limited to mail, but may be any information, for example, ringing melodies, images, weather forecasts, games, and so on.

As described above, the present invention has permitted the sender to check the delivery status of transmitted information within the scope of not infringing on the receiver's privacy in transmission of information between mobile communication terminals.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An information delivery management apparatus for managing delivery status of information transmitted from a mobile communication terminal to another mobile communication terminal, comprising;

first storage means for storing delivery status data indicating whether said information has been delivered to the receiver mobile communication terminal or not;

second storage means for storing check permission data indicating whether a check of the delivery status data of information is permitted or prohibited, for every mobile communication terminal;

updating means for, in response to an update request sent from the outside of the apparatus when said information is delivered to the receiver mobile communication terminal, updating the delivery status data of undelivered status about the receiver mobile communication terminal, stored in said first storage means, to data of delivered status when the check permission data about the receiver mobile communication terminal, stored in said second storage means, indicates "permitted;" and sending means for extracting said delivery status data stored in said first storage means, in response to a request from the sender mobile communication terminal and sending said extracted delivery status data to said sender mobile communication terminal.

2. The information delivery management apparatus according to claim 1, wherein when said check permission data about the receiver mobile communication terminal, stored in said second storage means, is "prohibited," said updating means, receiving said update request, updates said delivery status data of undelivered status stored in said first storage means, to data indicating that said check permission data is "prohibited."

3. The information delivery management apparatus according to claim 1, wherein when said check permission data about the receiver mobile communication terminal, stored in said second storage means, is "prohibited," said updating means, receiving said update request, does not update said delivery status data about the receiver mobile communication terminal stored in said first storage means.

4. The information delivery management apparatus according to claim 1, wherein said second storage means stores said information, and wherein after said sending means sends said delivery status data to the sender mobile communication terminal, said sending means retransmits said information to the receiver mobile communication terminal on the basis of a retransmission command sent from said sender mobile communication terminal.

5. An information delivery check system for checking delivery status of information sent from a mobile communication terminal to another mobile communication terminal, comprising:

mobile communication terminals of an information sender and an information receiver;

the information delivery management apparatus as set forth in claim 1; and a relay for relaying the information from said sender mobile communication terminal to send the information to said receiver mobile communication terminal and for sending the update request to the information delivery management apparatus when detecting delivery of said information to the receiver mobile communication terminal.

6. An information delivery management apparatus for managing delivery status of information transmitted from a mobile communication terminal to another mobile communication terminal, comprising:

first storage means for storing delivery status data indicating whether said information has been delivered to the receiver mobile communication terminal or not;

receiving means for receiving check permission data indicating whether a check of said delivery status data of the information from the receiver mobile communication terminal is permitted or prohibited, every time information is delivered;

updating means for, in response to an update request sent from the outside of the apparatus when said information is delivered to the receiver mobile communication terminal, updating the delivery status data of undelivered status about the receiver mobile communication terminal, stored in said first storage means, to data of delivered status when said check permission data received by said receiving means indicates "permitted;" and sending means for extracting said delivery status data stored in said first storage means, in response to a request from the sender mobile communication terminal and sending said delivery status data to said sender mobile communication terminal.

7. The information delivery management apparatus according to claim 6, wherein when said check permission data is "prohibited," said updating means, receiving said update request, updates said delivery status data of undelivered status stored in said first storage means, to data indicating that said check permission data is "prohibited."

8. The information delivery management apparatus according to claim 6, wherein when said check permission data is "prohibited," said updating means, receiving said update request, does not update said delivery status data about the receiver mobile communication terminal stored in said first storage means.

9. The information delivery management apparatus according to claim 6, wherein said second storage means stores said information, and wherein after said sending means sends said delivery status data to the sender mobile communication terminal, said sending means retransmits said information to the receiver mobile communication terminal on the basis of a retransmission command sent from said sender mobile communication terminal.

10. A mobile communication terminal capable of receiving information from another mobile communication terminal, which is capable of communicating with information delivery management apparatus having first storage means storing delivery status data indicating whether said information has been delivered or not, said mobile communication terminal comprising:

second storage means for storing check permission data, indicating whether a check of the delivery status data of information is permitted or prohibited, for every mobile communication terminal;

sending means designated to retransmit said information to the receiver mobile communication terminal, on the basis of a retransmission command sent from said sender mobile communication terminal, after said sending means sends said delivery status data to the sender communication terminal;

check permission determining means for determining check permission data indicating whether a check of said delivery status data of the information is permitted or prohibited, every time information is delivered; and transmitting means for transmitting said check permission data determined, to said information delivery management apparatus.

11. An information delivery check system for checking delivery status of information sent from a mobile communication terminal to another mobile communication terminal, comprising:

a mobile communication terminal for transmitting information;

the mobile communication terminal as set forth in claim 10, for receiving the information;

the information delivery management apparatus as set forth in claim 6; and a relay for relaying the information from said sender mobile communication terminal to send the information to said receiver mobile communication terminal and for sending the update request to the information delivery management apparatus when detecting delivery of said information to the receiver mobile communication terminal.

12. An information delivery check method for checking delivery status of information transmitted from a mobile communication terminal to another mobile communication terminal, comprising:

a step of storing delivery status data indicating whether said information has been delivered to the receiver mobile communication terminal or not, in first storage means of information delivery management apparatus comprising the first storage means, second storage means, updating means, and sending means;

a step of storing check permission data indicating whether a check of the delivery status data of the information is permitted or prohibited, for every mobile communication terminal is the second storage means;

a step of transmitting an update request for said delivery status data when a relay for relaying the information from the sender mobile communication terminal to send the information to the receiver mobile communication terminal, detects that said information has been delivered to the receiver mobile communication terminal;

a step of, in response to said update request, letting said updating means update the delivery status data of undelivered status about the receiver mobile communication terminal, stored in said first storage means, to data of delivered status when said check permission data about the receiver mobile communication terminal stored in the second storage means is "permitted;" and a step of letting said sending means extract said delivery status data stored in said first storage means, in response to a request from the sender mobile communication terminal and send said extracted delivery status data to the sender mobile communication terminal.

13. An information delivery check method for checking delivery status of information transmitted from a mobile communication terminal to another mobile communication terminal, comprising:

a step of storing delivery status data indicating whether said information has been delivered to the receiver mobile communication terminal or not, in first storage means of information delivery management apparatus comprising the first storage means, second storage means, updating means, and sending means;

a step of, when the receiver mobile communication terminal receives said information from a relay, requesting to make a decision on check permission data indicating whether a check of said delivery status data of the information is permitted or prohibited;

a step of letting said receiver mobile communication terminal transmit said check permission data determined, to said information delivery management apparatus;

a step of transmitting an update request for said delivery status data to said information delivery management apparatus when the relay for relaying the information from the sender mobile communication terminal to send the information to the receiver mobile communication terminal, detects that said information has been delivered to the receiver mobile communication terminal;

a step of, in response to said update request, letting said updating means update the delivery status data of undelivered status about the receiver mobile communication terminal, stored in said first storage means, to data of delivered status when said check permission data determined at said receiver mobile communication terminal is "permitted;" and a step of letting said sending means extract said delivery status data stored in said first storage means, in response to a request from the sender mobile communication terminal and send said extracted delivery status data to the sender mobile communication terminal.

14. An information delivery management apparatus for managing delivery status of information transmitted from a mobile communication terminal to another mobile communication terminal, comprising first storage means, sending means, receiving means, and updating means, wherein said first storage means are provided for storing delivery status indication whether said information has been delivered to the receiver mobile communication terminal or not;

said sending means are provided for extracting said delivery status data stored in said first storage means, in response to a request from the sender mobile communication terminal and sending said delivery status data to said sender mobile communication terminal, said information delivery management apparatus further comprises second storage means for storing check permission data indicating whether a check of the delivery status data of information is permitted or prohibited, for every mobile communication terminal;

said receiving means are provided for receiving check permission data indicating whether a check of said delivery status data of the information from the receiver mobile communication terminal is permitted or prohibited;

said updating means are provided for, in response to an update request sent from the outside of the system of the information delivery management apparatus when said information is delivered to the receiver mobile communication terminal, updating the delivery status data of undelivered status about the receiver mobile communication terminal, stored in said first storage means, to data of delivered status when said check permission data received by said receiving means indicates "permitted"; and said sending means is designed to retransmit said information to the receiver mobile communication terminal on the basis of a retransmission command sent from said sender mobile communication terminal (A), after said sending means sends said delivery status data to the sender mobile communication terminal.

15. The information delivery management apparatus according to claim 14, wherein said receiving means is designed to store said information.

16. The information delivery management apparatus according to claim 14, wherein said second storage is designed to store said information.

17. The information delivery management apparatus according to claim 14, wherein said updating means, receiving said update request, is designed to update said delivery status data of undelivered status stored in said first storage means, to data indicating that said check permission data is "prohibited", when said check permission data about the receiver mobile communication terminal, stored in said second storage means, is "prohibited".

18. The information delivery management apparatus according to claim 14, wherein said updating means, receiving said update request, is designed not to update said delivery status data about the receiver mobile communication terminal stored in said first storage means, when said check permission data is "prohibited".

19. The information delivery management apparatus according to claim 14, wherein said delivery status data is viewed on a display at the sender mobile communication terminal.

20. Information delivery check system for checking delivery status of information sent from a mobile communication terminal to another mobile communication terminal, comprising:

mobile communication terminals of an information sender and an information receiver; the information delivery management apparatus as set forth in either one of claim 1–6 and a rely for relaying the information from said sender mobile communication terminal to send the information to said receiver mobile communication terminal and for sending the update request to the information delivery management apparatus when detecting delivery of said information to the receiver mobile communication terminal.

21. The information delivery check system according to claim 20, further including a mobile communication terminal as set forth in claim 8, for receiving the information.

22. An information delivery check method for checking delivery status of information transmitted from a mobile communication terminal to another mobile communication terminal, comprising:

a step of storing delivery status data indicating whether said information has been delivered to the receiver mobile communication terminal or not, in first storage means of an information delivery management apparatus comprising said first storage means, second storage means, updating means, and sending means;

said method further comprising:

a step of storing check permission data in the second storage means, said check permission data indicating whether a check of the delivery status data of the information is permitted or prohibited, for every mobile communication terminal;

a step of transmitting an update request for said delivery status data with a rely for relying the information from the sender mobile communication terminal to send the information to the receiver mobile communication terminal, when said rely detects that said information has been delivered to the receiver mobile communication terminal;

a step of, in response to said update request, letting said updating means update the delivery status data of undelivered status about the receiver mobile communication terminal, stored in said first storage means, to data of delivered status when said check permission data about the receiver mobile communication terminal stored in the second storage means is "permitted";

a step of letting said sending means extract said delivery status data stared in said first storage means, in response to a request from the sender mobile communication terminal and send said extracted delivery status data to the sender mobile communication terminal; and a step of retransmitting said information to the receiver mobile communication terminal on the basis of a retransmission command sent from said sender mobile communication terminal, after said sending means sends said delivery status data to the sender mobile communication terminal.

23. The information delivery check method according to claim 22, further comprising a step of storing said information in receiving means.

24. The information delivery check method according to claim 22, further comprising a step of storing said information in said second storage means.

25. The information delivery check method according to claim 22, further comprising:

a step of, when the receiver mobile communication terminal receives said information from the relay, requesting to make a decision on check permission data indicating whether a check of said delivery status data of the information is permitted or prohibited; and a step of letting said receiver mobile communication terminal transmit said check permission data determined, to said information delivery management apparatus.

\* \* \* \* \*